Figure 3:
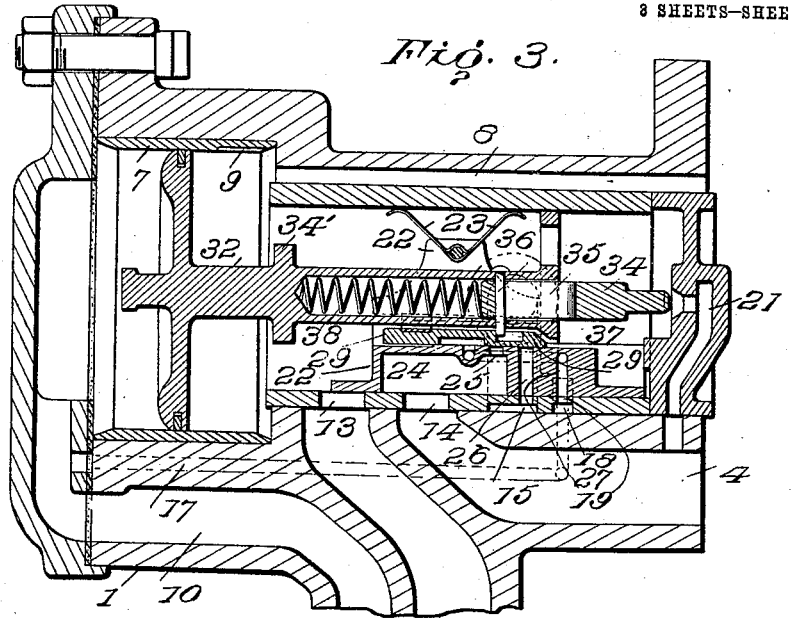

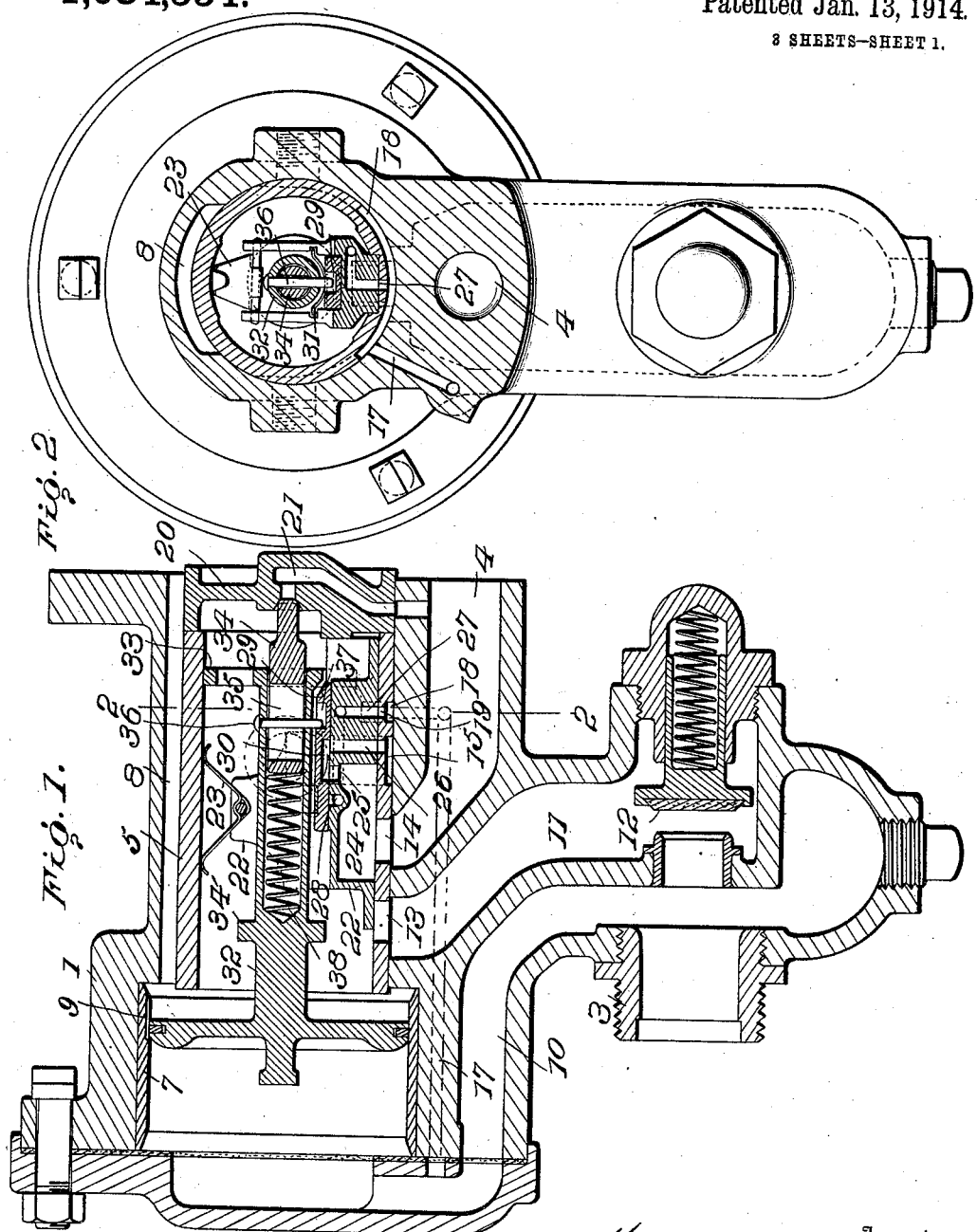

W. B. MANN, DEC'D.
C. M. G. MANN, ADMINISTRATRIX.
TRIPLE VALVE FOR AIR BRAKES.
APPLICATION FILED JUNE 14, 1906.

1,084,554.

Patented Jan. 13, 1914.
3 SHEETS—SHEET 2.

W. B. MANN, DEC'D.
C. M. G. MANN, ADMINISTRATRIX.
TRIPLE VALVE FOR AIR BRAKES.
APPLICATION FILED JUNE 14, 1906.
1,084,554.
Patented Jan. 13, 1914.
3 SHEETS—SHEET 3.
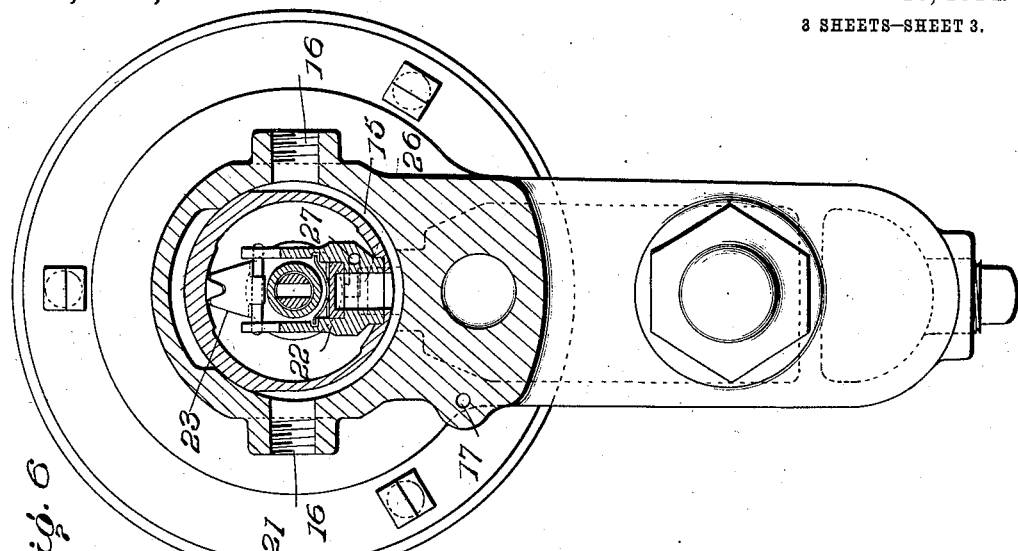
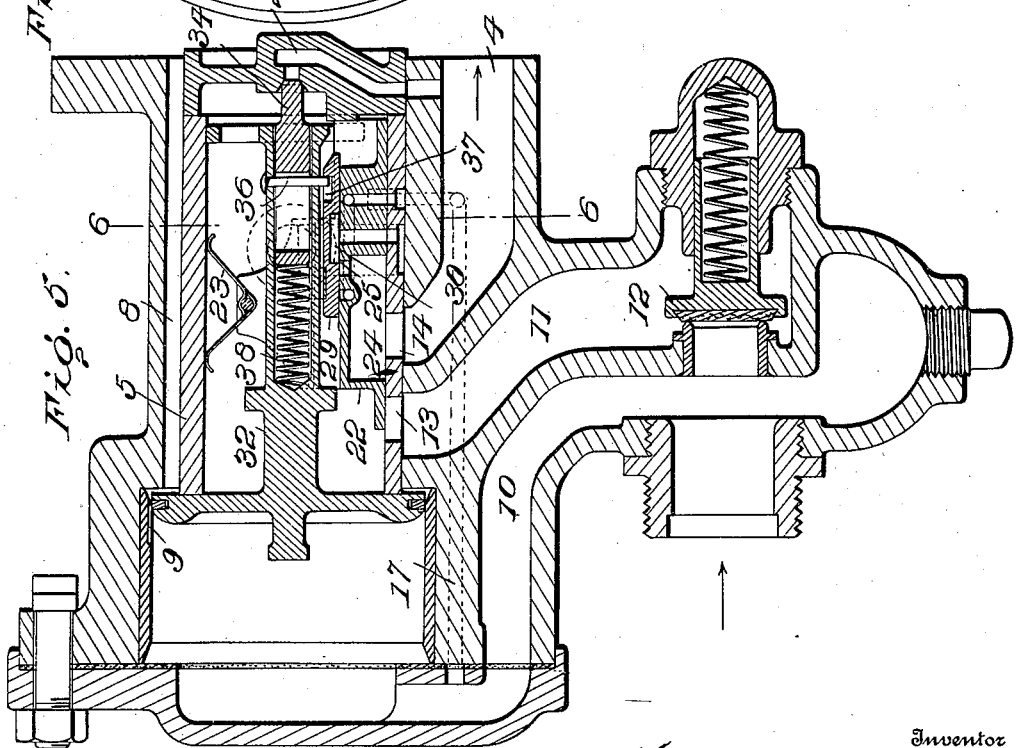

UNITED STATES PATENT OFFICE.

WILLIAM BRAYTON MANN, OF BALTIMORE, MARYLAND; CARRIE M. GRACE MANN ADMINISTRATRIX OF SAID WILLIAM BRAYTON MANN, DECEASED.

TRIPLE VALVE FOR AIR-BRAKES.

1,084,554.  Specification of Letters Patent.  Patented Jan. 13, 1914.

Application filed June 14, 1906. Serial No. 321,778.

*To all whom it may concern:*

Be it known that I, WILLIAM B. MANN, of Baltimore, Maryland, have invented a new and useful Improvement in Triple Valves for Air-Brakes, which improvement is fully set forth in the following specification.

The invention relates to air brakes, and more particularly to the triple valves employed in standard brake systems for controlling the application and release of the brakes.

Under present railway conditions, it is desirable to operate very long trains, sometimes as high as one hundred cars to a train, whereas heretofore, fifty to sixty cars have been considered the maximum length for a train. This increased length of trains has materially affected the problem of successfully braking the train. For example, when a reduction is made in train-pipe pressure for service applications of the brakes on such long trains, the reduction of pressure in the train-pipe is felt much more quickly at the forward end than at the rear of the train, and the result is that the brakes are applied on forward cars before any braking action takes place on the rear, the momentum of the forward cars being thereby checked while the momentum of the rear cars remains unchecked, thus producing great injury to the rolling stock. Again, in releasing the brakes on long trains, the increase in pressure at the forward end of the brake-pipe occurs much more quickly than at the rear part of the pipe, and the result is that the brakes are released on the forward cars of the train while they still remain applied at the rear end thereof, thus rendering liable the breaking in two of the train by reason of the drag on the rear end thereof. Moreover, the slow travel of increased pressure to the rear of the brake-pipe for the purpose of releasing the brakes is due not only to the length of the pipe, but among other things to the fact that the pressure in the pipe at the forward end of the train is largely absorbed by air passing to the auxiliary reservoirs on the forward cars for the purpose of recharging the same.

The objects of the present invention are, first, to provide for a serial and nearly simultaneous service application of the brakes on all cars throughout a long train; second, to provide for a release of the brakes at the rear end of a long train first, and then from the rear toward the forward end; third, to provide for the even recharging of the aux-
iliary reservoirs throughout a long train.

The serial and nearly simultaneous service application of the brakes throughout the length of the train is secured by the present invention by providing for a serial venting
of the train-pipe upon such service applications, which venting, however, is of a restricted character and not sufficient to produce emergency applications, since the reduction of the train-pipe pressure will be
insufficient to produce an emergency throw of the valve-operating piston now universally employed on all standard brakes. Preferably, in thus venting the train-pipe, the air passes from the train-pipe directly
to the brake cylinder, thereby utilizing the air which is vented from the train-pipe to augment the pressure in the brake cylinder, and thus effecting a substantial economy in the use of the compressed air. In some in-
stances, however, the air may, if desired, be vented directly to the atmosphere upon the service applications of the brakes without departing from the objects of my invention. The release of the brakes through the
length of the train from the rear toward the front end is accomplished in the present instance by retarding the release of the brakes on the forward part of the train, to the end that such release shall not occur until the
increase of pressure in the train-pipe occurs to a sufficient degree in the rear of the train to effect the release on the rear cars. This retarding of the release on the forward part of the train is accomplished by providing
an exhaust port which, when the pressure is increased in the train-pipe through the engineer's valve for the purpose of releasing the brakes, is materially restricted, so that the pressure in the brake cylinder escapes
very slowly therethrough, the restricted port, however, being gradually opened so that by the time the brakes at the rear of the train are thrown to full release position, the exhaust ports on the forward part of the
train are fully opened, and thus the exhaust is completed on all the cars throughout the train in a direction from the rear forward.

For the purpose of securing an even recharge of the auxiliary reservoirs throughout the train, and for the further purpose of preventing a depletion of the pressure in the forward part of the train-pipe during the first moment when the pressure is being increased for the purpose of releasing the brakes, means are provided in the present invention for restricting the passage of train-pipe air to the auxiliary reservoirs on the forward part of the train during substantially the same time that the restricted exhaust ports from the brake cylinders on the forward part of the train are closed occurs, thereby avoiding the depletion of the train-pipe at the forward end, and thus securing the more rapid and uniform rise of pressure at the rearward end of the brake-pipe. This restricted recharging of the auxiliary reservoirs on the forward cars causes the air pressure in the brake-pipe to rise more rapidly throughout the entire length of the pipe, and thus provides for the releasing of the brakes and the recharging of the auxiliary reservoirs throughout the train in a shorter time, thereby overcoming the liability of the rear brakes to stick. It also obviates the difficulty heretofore experienced of the re-application of the brakes on the forward end of the train after their release, which re-application is caused by the brake-pipe pressure at the forward end being lowered by reason of the recharging on the rear of the train after the forward brakes are off.

One of the principal objects of the present invention is to secure the above-mentioned desirable features without adding to the number of parts of the triple valve, and therefore without increasing complication in the same, to the end that the simplicity of the valve may be maintained, and thus its cheapness of construction and certainty of operation be secured.

In my United States application filed December 16th, 1905, Serial Number 292,111, I have described the construction of a triple valve, provided with a casing having ports leading to the train-pipe, the auxiliary reservoir and the atmosphere, and a plurality of ports leading to the brake cylinder, with a main valve through which air passes from one brake cylinder port to the atmosphere port for exhaust, and from the train-pipe port to the said brake cylinder port for emergency, a graduating valve independent of the main valve controlling the other brake cylinder port, an exhaust valve controlling the brake cylinder exhaust through the main valve, and the usual triple-valve-operating piston operably connected to all three of said valves, the graduating valve in that instance being shown as carried by the stem of the piston with a spring interposed between the said actuating valve and a seat or abutment in the piston stem; and in my United States Patent No. 650,017, granted May 22d, 1900, a similar construction of a graduating valve carried by the piston stem with a spring interposed between the graduating valve and the stem is shown.

The objects hereinbefore set forth are accomplished by the present invention without any interference with the other functions of the triple valve, and without any addition to the number of parts set forth in my said application Serial Number 292,111, the changes hereinafter described being principally slight modifications in the arrangement of the ports and the proportions of the parts, and the addition of a port or passage leading from the train-pipe to the brake cylinder.

It will be understood by those skilled in the art that the invention hereinafter described is capable of receiving a variety of mechanical expressions, and for the sake of clearly describing the invention, reference is had to one mechanical expression of said invention as shown in the accompanying drawings, but it is to be understood that such drawings are for the purpose of description only, and not as defining the limits of the invention, reference being had to the description and claims for that purpose.

Figure 4:
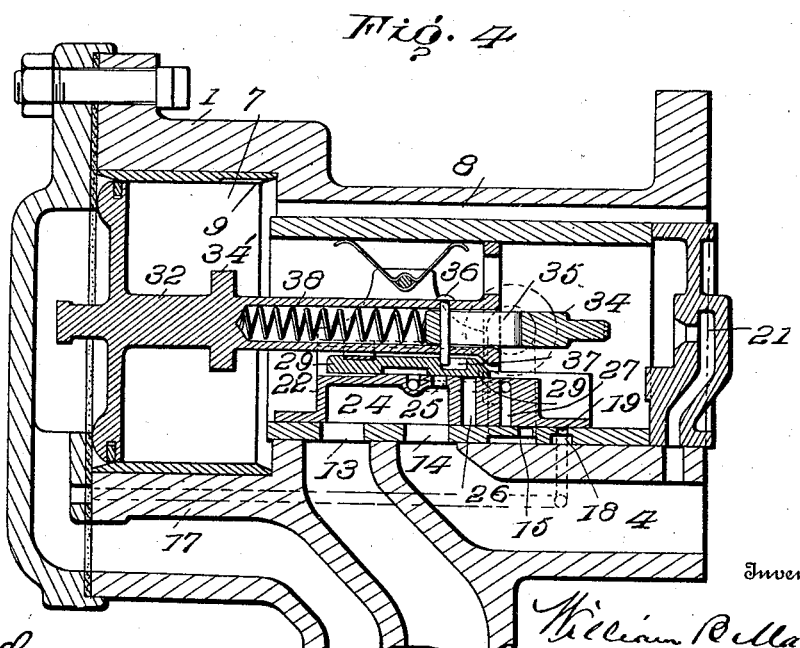

In said drawings Figure 1 is a vertical longitudinal section of my improved triple valve with the parts in full release or normal running position; Fig. 2 is a vertical transverse section on the line 2—2 of Fig. 1; Fig. 3 is a vertical longitudinal section similar to Fig. 1, with the parts shown in the position when service application of the brakes is being made, and air is passing from the auxiliary reservoirs to the brake cylinders; Fig. 4 is a view similar to Fig. 3 but with the parts in position for emergency application of the brakes; Fig. 5 is a view similar to Fig. 1 with the parts in the position which they occupy for a restricted exhaust of the brake cylinder and restricted recharging of the auxiliary reservoir; and Fig. 6 is a vertical transverse section on the line 6—6 of Fig. 5.

Referring to the drawings, in which similar reference numerals refer to similar parts, 1 is the valve casing proper provided with a coupling 3 where the train-pipe is connected to the casing and a port 4 leading to the brake cylinder, as set forth in my aforementioned application. Within the casing 1 there is a bushing 5 which forms the valve chamber proper, and a bushing 7 which forms the cylinder within which the usual piston reciprocates, as in all standard valves. Above the bushing 5 and formed in the wall of the casing 1 is a conduit 8 leading from the piston chamber 7 to the auxiliary reservoir. The left-hand end of bushing 5, as shown in Figs. 1, 3 and 5, is ground so as to form a close and air-tight joint between the end of the bushing and the face of the piston, so that when the piston rests against the end of the bushing as shown in Fig. 5, no air can pass from the auxiliary reservoir to the valve chamber or from the valve chamber to the auxiliary reservoir. Formed in the inner wall of the bushing cylinder 7 is a groove 9 through which air can pass from the train-pipe side of the piston to the auxiliary reservoir side thereof, this feed-in duct being similar to the duct usually found in air-brakes of this class, with the exception that it is slightly longer than the feed-in duct usually employed and preferably slightly more restricted in cross section.

The valve casing is provided with a conduit 10 leading from the train-pipe to the piston cylinder 7, and a conduit 11 leading from the train-pipe past a check-valve 12 and through a port 13 to the interior of the valve chamber. The brake cylinder conduit 4 also leads to the interior of said valve chamber through a port 14, said ports 13 and 14 being large ports through which air may freely and unrestrictedly pass. A groove 15 is cut partially around the exterior wall of the bushing 5, as clearly shown in full lines in Figs. 1, 3, 5 and 6, and communicating with lateral ports 16—16, which ports open to the atmosphere, and may, if desired, be screw-threaded, to the end that either one of them may on occasion be closed by a suitable nut. Leading from the train-pipe conduit 10 through the body of the casing 1 is a conduit 17 shown in dotted lines in Figs. 1, 3 and 5, and in full lines in Figs. 2 and 6, said conduit terminating in a groove 18 formed on the exterior wall of the bushing 5, while a port 19 leads from said groove 18 to the interior of the valve chamber. The auxiliary reservoir end of the valve chamber is closed by a partition 20 within which is formed a conduit 21 leading from the valve chamber to the brake cylinder conduit 4. The valve 22 is held to its seat within the chamber by a suitable spring 23 of the usual or any suitable construction, and is provided with a large cavity 24 of sufficient length to connect the ports 13 and 14 when the parts are in emergency position, as clearly shown in Fig. 4. The valve 22 is also provided with a port 25 leading from the cavity 24 through the top wall of the valve and with a port 26 leading from top to bottom through the valve, which port 26 is so positioned that when the parts are in normal or full release position, it registers with exhaust groove 15. Furthermore, the valve 22 is provided with a duct 27 extending through the body of the valve, one end of the duct registering with the port 19 when the valve is in normal position and the other end of the duct being provided with a port 28 opening out through the top of the valve into the valve chamber. Resting upon the valve 22 is a slide valve 29 which has formed on its under side a cavity 30 of sufficient length to connect and fully register with the ports 25 and 26 formed in the valve 22, which cavity is so proportioned that when the parts are in normal or full release position shown in Fig. 1, it affords unrestricted communication between the port 25 and the exhaust port 26. In addition to this, the slide valve 29 is of such length that when in normal position shown in Fig. 1, it covers and closes the port 28, thereby effectually closing communication between the train-pipe and the valve chamber. This valve 29 is held to its seat by a spring 31 (see Fig. 2) which re-acts between said valve and the upwardly projecting side flanges of the valve 22. The ports 25 and 28 are so spaced that during the movements of the valve 29, as hereinafter described, said ports 25 and 28 are momentarily connected by the cavity 30 in the valve 29.

The valve-piston is provided with the usual or any suitable piston stem 32 having a spider 33 on the extreme end thereof, and a flange or shoulder 34', which spider and shoulder engage and operate the valve 22 in a way usual in this art, there being however a certain amount of lost motion between the piston stem and the valve. Mounted within the piston stem 32 is graduating valve 34 which controls port 21 leading from the valve chamber to the brake cylinder, said valve having a vertical longitudinal slot 35 formed therein, and a pin 36 extends through the body of the piston stem and the slot 35 in the valve 34, the lower end of said pin projecting down below the piston stem and entering a groove 37 in the top of the slide valve 29, the length of the groove permitting a certain amount of lost motion between the piston stem and the said valve. Situated in the bore of the piston stem 32 is a spring 38 re-acting between the end of said bore and the graduating valve 34, and serving to hold the graduating valve to its seat.

*Operation.*—The operation of the valve will, for the sake of clearness, be described under four separate heads, viz., for emergency application of the brakes, service or graduated application of the brakes, retarded release of the brakes, and retarded recharging of the auxiliary reservoirs.

*Emergency applications.*—For emergency application of the brakes, the engineer makes the usual large reduction in train-pipe pressure when the piston is thrown to position shown in Fig. 4. During this operation the exhaust from the brake cylinder to the atmosphere is closed, and communication from the train-pipe to the brake cylinder is open via the conduit 11, port 13, cavity 24 in the valve 22, port 14, and the brake cylinder conduit 4, thereby venting a large volume of air from the train-pipe to the brake cylinder and producing quick serial application of the brakes, in the manner set forth in my said application Serial Number 292,111. Simultaneous with the serial venting of the train-pipe for the emergency application, the conduit 21 leading from the valve chamber to the brake cylinder is thrown wide open, the valve 34 being withdrawn from its seat, and air passes from the auxiliary reservoir via the conduit 8, piston cylinder 7, the valve chamber the conduits 21 and 4 to the brake cylinder.

*Service applications.*—When service application of the brakes is desired, the engineer makes a small reduction in train-pipe pressure, thereby causing the valve-operating piston to shift to the position shown in Fig. 3. During this shifting operation, the valve 22 is not moved, as will be clearly shown from inspection of said Figs. 1 and 3. The slide valve 29, however, is moved by reason of the engagement of the pin 36 in groove 29, and shifted from the position shown in Fig. 1 to that shown in Fig. 3. During the first part of this shifting movement, communication between the ports 25 and 26 in the valve 22 is closed, thereby cutting off the brake cylinder from the atmosphere, and immediately after this closure occurs, communication is established for a brief instant of time between the ports 25 and 28 through the cavity 30 in the valve 29. This communication continues only during the time required for said cavity to pass over the port 25. During this brief instant of time, air is vented from the train-pipe to the brake cylinder via conduits 10 and 17, the groove 18, conduit 27, ports 28 and 25, cavity 24, port 14 and conduit 4 leading to the brake cylinder. There is thus a small amount of air taken from the train-pipe at each triple valve, and the pressure in the train-pipe is therefore rapidly and serially vented throughout the length of the train, the venting, however, being so small in amount as not to produce a reduction in train-pipe pressure sufficient to cause an emergency application. At the instant before the slide valve 29 closes the port 25, as shown in Fig. 3, the pin 36 reaches the rear of the slot 35 in the graduating valve 34, and said valve is withdrawn from its seat, thereby permitting air to pass via the conduit 8, the valve chamber and the conduit 21 to the brake cylinder, as clearly shown in Fig. 3. It will be observed that in thus producing the serial venting of the train-pipe to the brake cylinder for service or graduated application of the brakes, the train-pipe air does not have to pass the check valve 12 and overcome the resistance of its spring, but passes directly from the train-pipe to the brake cylinder without any opposition of this character. By reason of this direct passage the rapidity of action and sensitiveness of the device is assured. The pressure in the auxiliary reservoir having been reduced to the point slightly below that in the train-pipe, the valve piston moves from left to right for a very slight distance, such movement being sufficient to permit the valve 34 to close the conduit 21, but by reason of the lost motion between the pin 36 and the slide valve 29, the latter valve is not moved, and the brakes are thus held with the desired pressure in the brake cylinder. Should it be found desirable to further increase the pressure in the cylinder, or as it is technically known, to "graduate" the application, slight additional decrease in train-pipe pressure will cause the piston to again shift to the position shown in Fig. 3, when the valve 34 is opened, and an additional amount of air to pass from the auxiliary reservoir to the brake cylinder. This operation may be repeated as many times as desired until equalization of pressure between the auxiliary reservoir and the brake cylinder occurs.

*Retarded release of the brakes.*—When it is desired to release the brakes, the engineer increases the brake-pipe pressure through the engineer's valve, in the usual way, and the valve piston is thrown to the position shown in Fig. 5 on those cars which are on the forward part of the train. During this movement the graduating valve 34 is first seated, and the further movement of the piston after the graduating valve has reached its seat results in the compression of the spring 38 between the rear end of the graduating valve and the piston stem, and during this further movement of the piston relative to the graduating valve the pin 36 impinges on the forward end of the cavity 37 in the slide valve 29 and shifts it to the right to such an extent that the cavity 30 therein very nearly over-shoots the port 25 in the valve 22, leaving but a restricted passage from the cavity 24 to the exhaust, so that the pressure in the brake cylinder escapes through a restricted passage, and the brakes, when the parts are in this position, are very slowly released. During this time but a very small amount of air is permitted to pass from the train-pipe to the auxiliary reservoir, since the large and unobstructed passage via the conduit 11 is cloesd by the ground joint between the valve piston and the bushing 5, and only a small amount of air can pass through the feed-in duct 9. There is, therefore, but a very slight reduction of train-pipe pressure caused by the passage of air to the auxiliary reservoirs on the cars at the forward part of the train, this reduction in fact being so slight as to be practically negligible. The result of this is that the increased pressure in the train-pipe via the engineer's valve is rapidly transmitted throughout the entire length of the train, the pressure when it reaches the rear end of the brake-pipe being but slightly below that on the forward end of the train. This difference, however, between the pressure in the brake-pipe at the forward and the rear ends of the train effects a retarded release of the brakes on the forward cars, and a more prompt release of the brakes on the rearward cars. When the pressure in the train-pipe has been lowered, or rather, as the pressure in the train-pipe falls through the recharging of the auxiliary reservoirs, the tension of the spring 38 in the piston stem 32 serves to gradually shift the piston from the restricted release position shown in Fig. 5 to the normal or full release position shown in Fig. 1, thereby fully opening the exhaust from the brake cylinder to the atmosphere by reason of the shifting of the slide valve 29 from the position shown in Fig. 5 to the position shown in Fig. 1.

*Retarded charging of the auxiliary reservoirs.*—As above explained, when the parts are in the position of restricted release of the brakes, shown in Fig. 5, air can not pass to the auxiliary reservoir from the train-pipe by way of the check valve 12, conduit 11, port 13, valve chamber and conduit 8, and only such air reaches the auxiliary reservoir as may enter through the restricted feed-in duct 9, so that on the cars on the forward part of the train, where the valves are held in the position of restricted release of the brakes, there is but a slow recharging of the auxiliary reservoirs until the time when the parts shift from the position of restricted release shown in Fig. 5 to the position of full release shown in Fig. 1, at which time air passes in full volume by way of the check valve 12, conduit 11, valve chamber and conduit 8 to the auxiliary reservoirs, and thereby instantly recharges these reservoirs to within a fraction of their maximum pressure, the difference between the pressure in the auxiliary reservoirs and the train-pipe being only that due to the tension of the spring on the check valve. After the check valve 12 closes, the pressure between the train-pipe and the auxiliary reservoir will equalize through the feed-in duct 9.

It will be observed that when the parts are in their full release or normal position illustrated in Fig. 1, the brake-cylinder is in full and unrestricted communication with the atmosphere through the ports 25 and 26 and the connecting cavity 30, but that when the full release pressure is first admitted to the train-pipe from the engineer's valve, those valves on the forward part of the train are all thrown to a position to establish a restricted passage leading from the brake cylinder to the atmosphere, which passage, as the brakes are released, gradually is enlarged through the action of the spring 38, until, when the valve reaches its normal position, the brake-cylinder is again in full and unrestricted communication with the atmosphere. It will also be observed that during the time when the brake cylinder is in restricted communication with the atmosphere the auxiliary reservoir is also in restricted communication with the train-pipe, and that as the parts are gradually returned to their normal position (shown in Fig. 1), by the action of the spring 38, full and unrestricted communication between the train-pipe and the auxiliary reservoirs is restored by reason of the valve piston moving from right to left and away from the ground end of the bushing 5.

A study of the construction herein described will disclose the fact that without in any way detracting from the sensitiveness of action of the valve described in my application Serial Number 292,111, and without any increase in the number of parts, I have effectually provided for the release of the brakes from the rear toward the forward end of the train, and the retarded recharging of the auxiliary reservoirs on the forward part of the train, and also for the quick serial venting of the train-pipe in service applications of the brakes. I have therefore, without adding to the expense of construction, and without further complicating the construction, materially increased the functions of the triple valve described and claimed in my said previous application.

What I claim is:

1. In a triple valve, a valve having a normal or full release position and a restricted release position, a graduating valve controlling the passage of auxiliary reservoir air to the brake cylinder, a piston for operating both of said valves with lost motion between the valves and piston, and a spring reacting between said graduating valve and piston whereby said first mentioned valve is moved from restricted release position to full release position.

2. In a triple valve for air brakes, a piston having a partial traverse for service applications and a full or further traverse for emergency applications of the brakes, a valve moving with said piston only on emergency applications and through which the brake cylinder exhausts, a graduating valve independent of the first-mentioned valve and moving with the piston on both emergency and service applications, and a slide valve mounted on said first-mentioned valve and controlling the exhaust therethrough, said slide valve being operatively connected to said piston and permitting an unrestricted or a restricted exhaust through said first-mentioned valve dependent upon the differential pressures on opposite sides of said piston.

3. In a triple valve for air brakes, the combination of an exhaust valve and a valve-operating piston operated by variations in train-pipe pressure and each having an unrestricted release position and a restricted release position, of a spring carried by said piston and tending through it to throw said valve from restricted to full or unrestricted release position.

4. In a triple valve for air brakes, the combination of an exhaust valve, an emergency valve and a valve operating piston engaging both of said valves, said exhaust valve and piston each having a full or unrestricted release position and a restricted release position, and said emergency valve moving only on emergency applications, and means acting on said piston and tending to throw it from restricted to full or unrestricted release position.

5. In a triple valve for air brakes, the combination of an exhaust valve, an emergency valve, and a valve-operating piston engaging both of said valves, said exhaust valve and piston each having a full or unrestricted release position and a restricted release position, and said emergency valve moving only on emergency applications, and a spring acting on said piston and tending to throw it from restricted to full or unrestricted release position.

6. In a triple valve for air brakes, the combination of a valve through which exhaust from the brake cylinder passes to release the brakes, an exhaust valve controlling said exhaust, a valve-operating piston operatively connected to both of said valves, said piston and exhaust valve each having a full or unrestricted release position and a restricted release position, and a spring acting on said piston and tending to throw it to the full or unrestricted release position.

7. In a triple valve for air brakes, the combination of a valve through which exhaust from the brake cylinder passes to release the brakes, an exhaust valve controlling said exhaust, a valve-operating piston operatively connected to both of said valves, said piston and exhaust valve each having a full or unrestricted release position and a restricted release position, and means acting on said piston and tending to throw it to the full or unrestricted release position.

8. In a triple valve for air brakes, the combination of a valve through which exhaust from the brake cylinder passes to release the brakes, an exhaust valve controlling said exhaust, a piston operatively connected to said exhaust valve, said piston and exhaust valve each having an unrestricted or full release position and a restricted release position, a graduating valve carried by said piston, and a spring acting on said piston and tending to throw it from the restricted release position to the full release position.

9. In a triple valve for air brakes, the combination of a valve through which exhaust from the brake cylinder passes to release the brakes, an exhaust valve controlling said exhaust, a piston operatively connected to said exhaust valve, said piston and exhaust valve each having an unrestricted or full release position and a restricted release position, a graduating valve carried by said piston, and means acting on said piston and tending to throw it from the restricted release position to the full release position.

10. In a triple valve for air brakes, the combination of an exhaust valve, a graduating valve and a valve-operating piston, said exhaust valve and piston each having an unrestricted or full release position and a restricted release position, and a spring carried by said piston and tending to throw it from restricted to unrestricted release position.

11. In a triple valve for air brakes, the combination of an exhaust valve, a graduating valve and a valve-operating piston, said exhaust valve and piston each having an unrestricted or full release position and a restricted release position, and means carried by said piston and tending to throw it from restricted to unrestricted release position.

12. In a triple valve for air brakes, the combination of an exhaust valve, a graduating valve and a valve-operating piston, said exhaust valve and piston each having an unrestricted or full release position and a restricted release position, and a spring reacting between said piston and graduating valve and tending to throw said piston from restricted to full or unrestricted release position.

13. In a triple valve for air brakes, the combination of a valve through which exhaust passes to release the brakes, an exhaust valve capable of movement independent of said first mentioned valve, a piston operatively connected to both of said valves, a graduating valve carried by said piston and controlling the passage of air from the auxiliary reservoir to the brake cylinder, said exhaust valve and piston each having a full or unrestricted release position and a restricted release position, and a spring acting on said piston, and tending to throw it from restricted to full or unrestricted release position.

14. In a triple valve for air brakes, the combination of a valve-operating piston having a graduating or service position, a restricted release position, and a full release position intermediate said graduating and restricted release positions, an exhaust valve operated by said piston to control the exhaust from the brake cylinder, a graduating valve operatively connected to said piston but movable relatively thereto, and a tension device reacting between said graduating valve and piston.

15. In a triple valve for air brakes, the combination of a casing having a restricted charging passage and an unrestricted charging passage from the train-pipe to the auxiliary reservoir, an exhaust valve affording a restricted and an unrestricted exhaust from the brake-cylinder, and a piston directly controlling said charging passages and said exhaust valve and having a restricted release position, a braking position permitting air to pass from the auxiliary reservoir to the brake cylinder, and a full release position intermediate said braking and restricted release positions.

16. In a triple valve for air brakes, the combination of a passage leading from the train-pipe to the valve chamber, a valve immovable on service applications and having a port normally registering with said passage and a port in communication with the brake cylinder, said ports being normally disconnected, and a valve shiftable on said first-mentioned valve and momentarily connecting and disconnecting said ports upon service applications.

17. A triple valve device comprising a casing containing a piston subject to variations in train pipe pressure, valvular means actuated by said piston for controlling the supply of fluid to the brake cylinder and the release from the brake cylinder, the means controlling the release from the brake cylinder having a normal full release position and an inner retarded release position, and a yielding resistance means carried by the moving parts of the valve mechanism and acting to oppose the movement of same from its full release position to its retarded release position.

18. A triple valve device comprising a casing containing a piston subject to variations in train pipe pressure, valvular means actuated by said piston for controlling the supply of fluid to the brake cylinder and the release from the brake cylinder, the means controlling the release from the brake cylinder having a normal full release position and an inner retarded release position, and a spring carried by the moving parts of the valve mechanism and tending to move the same from the retarded release position to the normal full release position.

19. In a triple valve device, a valve mechanism comprising a piston subject to variations in train pipe pressure and a valve operated thereby for controlling the release from the brake cylinder, said valve mechanism having a normal full release position and a retarded release position, a spring carried by said valve mechanism and tending to move the same from its retarded release position to full release position, and a fixed stop for engaging one end of the spring in full release position.

20. In a fluid pressure brake, the combination with a train pipe and brake cylinder, of a valve for controlling the release of air from the brake cylinder, having a full release position and a retarded release position, a piston subject to variations in train pipe pressure for actuating said valve, and a yielding resistance device carried by the piston for opposing the movement of said valve and piston from full release to the retarded release position.

21. In a fluid pressure brake, the combination with a train pipe and brake cylinder, of a valve for controlling the brake cylinder exhaust, having a full release position and a retarded release position, an actuating piston therefor, operated by variations in train pipe pressure, and yielding resistance means carried by said piston for returning said valve and piston from the retarded release position to the full release position.

22. In a fluid pressure brake, the combination with a train pipe and brake cylinder, of a valve for controlling the brake cylinder exhaust, having a full release position and a retarded release position, an actuating piston therefor, operated by an increase in train pipe pressure for shifting said valve to the retarded release position, and a spring carried by said piston for returning said valve to the full release position.

23. A triple valve device comprising a valve for controlling the exhaust from the brake cylinder, a piston for operating the same, and a yielding resistance mechanism carried by the piston for resisting movement of said valve from normal release position to a position in which the release of air from the brake cylinder is retarded.

24. In a triple valve device, the combination with a piston and valve means operated by said piston and having a normal release position and an inner position in which the release of air from the brake cylinder is restricted, of means for opposing the movement of said valve means from normal release position to the inner position, said valve means being adapted to directly control a local emergency train pipe vent port.

In testimony whereof I have signed this specification in the presence of two subscribing witnesses.

WILLIAM BRAYTON MANN.

Witnesses:
 M. LILIENTHAL,
 ADDIE G. KENNARD.